(12) United States Patent
Kim et al.

(10) Patent No.: US 7,821,601 B2
(45) Date of Patent: Oct. 26, 2010

(54) TRANSFLECTIVE LIQUID CRYSTAL DISPLAY DEVICE COMPRISING DOMAIN PARTITIONING MEMBERS DISPOSED IN THE REFLECTIVE AREA AND NOT IN THE TRANSMISSIVE AREA

(75) Inventors: Sang-Il Kim, Suwon-si (KR); Jeong-Ye Choi, Suwon-si (KR); Jin-Hong Kim, Yongin-si (KR); Wang-Su Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 360 days.

(21) Appl. No.: 11/155,378

(22) Filed: Jun. 17, 2005

(65) Prior Publication Data

US 2006/0082705 A1    Apr. 20, 2006

(30) Foreign Application Priority Data

Oct. 19, 2004    (KR) ............... 10-2004-0083551

(51) Int. Cl.
*G02F 1/1335* (2006.01)
*G02F 1/1337* (2006.01)
*G02F 1/1343* (2006.01)

(52) U.S. Cl. ............... 349/129; 349/114; 349/130; 349/143

(58) Field of Classification Search ............... 349/114, 349/129, 44, 50, 56, 113
See application file for complete search history.

(56) References Cited

U.S. PATENT DOCUMENTS

| | | | | |
|---|---|---|---|---|
| 6,195,140 B1* | 2/2001 | Kubo et al. | ............... | 349/44 |
| 6,504,592 B1* | 1/2003 | Takatori et al. | ............... | 349/129 |
| 6,788,375 B2* | 9/2004 | Ogishima et al. | ............... | 349/130 |
| 7,126,657 B2* | 10/2006 | Okumura | ............... | 349/114 |
| 7,176,996 B2* | 2/2007 | Rho | ............... | 349/114 |
| 2002/0071080 A1* | 6/2002 | Taniguchi et al. | ............... | 349/139 |
| 2002/0149728 A1* | 10/2002 | Ogishima et al. | ............... | 349/129 |
| 2003/0128315 A1* | 7/2003 | Tashiro et al. | ............... | 349/113 |
| 2003/0160918 A1* | 8/2003 | Rho | ............... | 349/113 |
| 2004/0004689 A1* | 1/2004 | Song et al. | ............... | 349/141 |
| 2004/0012738 A1* | 1/2004 | Murai et al. | ............... | 349/114 |
| 2004/0105062 A1* | 6/2004 | Lai et al. | ............... | 349/129 |
| 2004/0212763 A1* | 10/2004 | Tsuchiya | ............... | 349/114 |
| 2004/0212764 A1* | 10/2004 | Tanaka et al. | ............... | 349/114 |

FOREIGN PATENT DOCUMENTS

| | | |
|---|---|---|
| JP | 2000267102 | 9/2000 |
| JP | 2003043488 | 2/2003 |
| JP | 2003177384 | 6/2003 |
| JP | 2003215561 | 7/2003 |

(Continued)

*Primary Examiner*—Andrew Schechter
*Assistant Examiner*—Charles Chang
(74) *Attorney, Agent, or Firm*—Cantor Colburn LLP (57) ABSTRACT

A display device includes a first panel and a second panel facing each other, a liquid crystal layer and a member for determining a tilt direction of liquid crystal molecules of the liquid crystal layer. The display device has a reflective area and a transmissive area. The liquid crystal layer is interposed between the first panel and the second panel. The member is disposed at a portion of the second panel corresponding to the reflective area. The display device realizes a multi-domain structure and prominent reflective efficiency is obtained by utilizing a projection area as a reflective area.

24 Claims, 8 Drawing Sheets

FOREIGN PATENT DOCUMENTS

| | | |
|---|---|---|
| JP | 2004004938 | 1/2004 |
| JP | 2004069767 | 3/2004 |
| KR | 1020030057638 | 7/2003 |
| KR | 1020030058012 | 7/2003 |
| KR | 1020040055666 | 6/2004 |
| KR | 1020040057945 | 7/2004 |
| KR | 1020040061785 | 7/2004 |
| KR | 1020040062083 | 7/2004 |
| KR | 1020040062159 | 7/2004 |

* cited by examiner

TRANSFLECTIVE LIQUID CRYSTAL DISPLAY DEVICE COMPRISING DOMAIN PARTITIONING MEMBERS DISPOSED IN THE REFLECTIVE AREA AND NOT IN THE TRANSMISSIVE AREA

This application claims priority to Korean Patent Application No. 2004-0083551, filed on Oct. 19, 2004, and all the benefits accruing therefrom under 35 U.S.C §119, and the contents of which in its entirety are herein incorporated by reference.

BACKGROUND OF THE INVENTION (a) Field of the Invention

The present invention relates to a liquid crystal display (LCD) device and, more particularly, to a transflective liquid crystal display device.

(b) Description of the Related Art

Generally, an LCD device includes a pair of panels each having field generating electrodes disposed on their inner surfaces, and a dielectric anisotropy liquid crystal layer interposed between the pair of panels. In the LCD device, a variation of a voltage difference between the field generating electrodes, i.e., a variation in strength of an electric field generated by the field generating electrodes changes a transmittance of light passing through the LCD device, and thus images are obtained by controlling the voltage difference between the field generating electrodes.

The LCD device utilizes artificial light emitted by lamps of a backlight unit separately provided, or ambient light as a light source because the LCD device is a light-receiving device incapable of self-emitting. In the LCD device, the artificial light emitted by the lamps of the backlight unit or the ambient light passes through the liquid crystal layer only once, or twice by reflection. An LCD device using the artificial light emitted by the lamps is called a "transmissive" type of LCD device and an LCD device using the ambient light is called a "reflective" type of LCD device. The reflective type LCD devices are commonly used in medium and small size display devices. Another type of LCD device is a "transflective" or "reflective-transmissive" LCD device capable of selectively using light from the backlight unit and ambient light in response to current circumstances. The transflective LCD device is commonly used in medium and small size display devices.

In the transflective LCD device, since each pixel has a transmissive area where light passes through the liquid crystal layer only once, and a reflective area where light passes through the liquid crystal layer twice, a thickness of the liquid crystal layer disposed in the transmissive area, i.e., a cell gap of the transmissive area, is formed differently from a cell gap of the reflective area. The transflective LCD device may be driven with different voltages in a transmissive mode than in a reflective mode. In the transmissive mode, the transflective LCD device mainly uses the transmissive area, and in the reflective mode, the transflective LCD device mainly uses the reflective areas Meanwhile, LCD devices have a drawback in that a standard viewing angle, based on a contrast ratio above a predetermined level, is not very wide. A narrow standard viewing angle has been relatively unimportant since transflective LCD devices had been commonly used in the medium and small size display devices as mentioned above. However, recently, as the medium and small size display devices are used for a greater variety of purposes, demands for a wide viewing angle of transflective LCD devices are increasing.

Various methods have been proposed to enlarge the standard viewing angle of LCD devices. A widely used method is to align the liquid crystal layer vertically with respect to the pair of panels and to form apertures in or projections on the field generating electrodes. Another method is to control tilt directions of liquid crystal molecules of the liquid crystal layer in various manners when an electric field is generated in the liquid crystal layer.

However, when the above-described methods are applied to the transflective LCD device commonly used in the medium and small size display devices, an additional process is required to form the apertures in the field generating electrodes. Further, it is not so easy to form the apertures in pixels accurately because the pixels are very small.

SUMMARY OF THE INVENTION

A technical objective of the present invention is to overcome some problems of typical prior art LCD devices.

According to an aspect of the present invention, there is provided a display device comprising a first panel and a second panel facing each other, a liquid crystal layer and a member for determining tilt direction of liquid crystal molecules of the liquid crystal layer. The display device has a reflective area and a transmissive area. The liquid crystal layer is interposed between the first panel and the second panel. The member is disposed at a portion of the second panel corresponding to the reflective area.

According to another aspect of the present invention, there is provided a liquid crystal display device comprising a first panel, a second panel and a liquid crystal layer. The first panel includes a reflective electrode and a transparent electrode. The second panel is disposed opposite to the first panel and includes a pair of projections adjacent to each other and extending parallel to each other, and a common electrode. The liquid crystal layer is interposed between the first panel and the second panel.

BRIEF DESCRIPTION OF THE DRAWINGS

The above objects and other advantages of the present invention will become more apparent by describing exemplary embodiments thereof in more detail with reference to the accompanying drawings.

DETAILED DESCRIPTION OF THE INVENTION

Embodiments of the present invention will be described more fully hereinafter with reference to the accompanying drawings, in which exemplary embodiments of the invention are shown. The present invention may, however, be embodied in different forms and should not be construed as being limited to the embodiments set forth herein. Rather, these exemplary embodiments are provided so that this disclosure will be thorough and complete, and will fully convey the scope of the invention to those skilled in the art.

In the drawings, thicknesses of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, LCD devices according to exemplary embodiments of the present invention will be described in detail with reference to the accompanying drawings.

First, an LCD device according to an exemplary embodiment of the present invention will be described in detail with reference to FIG. 1 to FIG. 3.

Figure 1:
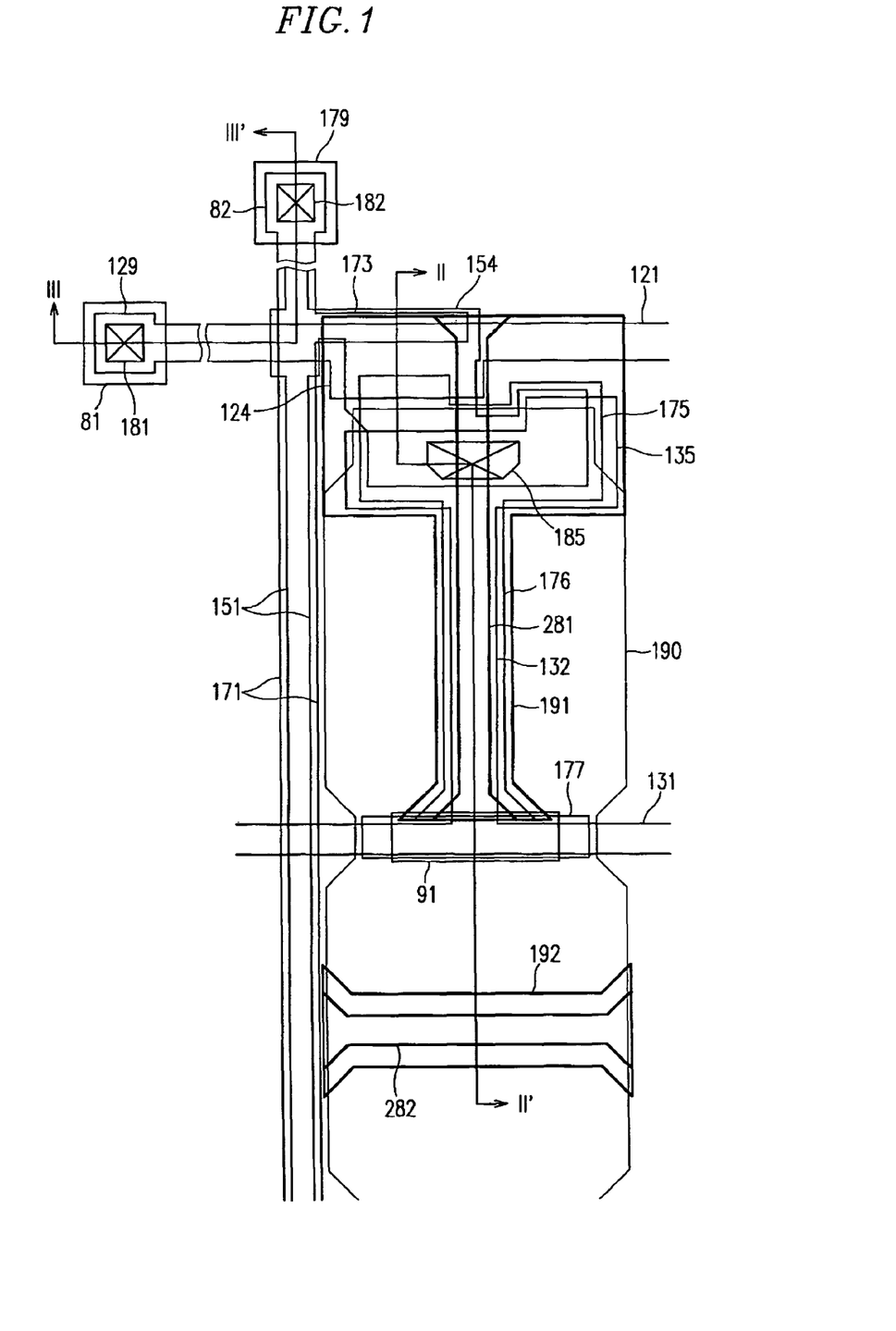
FIG. 1 is a layout view of an LCD device according to an exemplary embodiment of the present invention.
Figure 2:
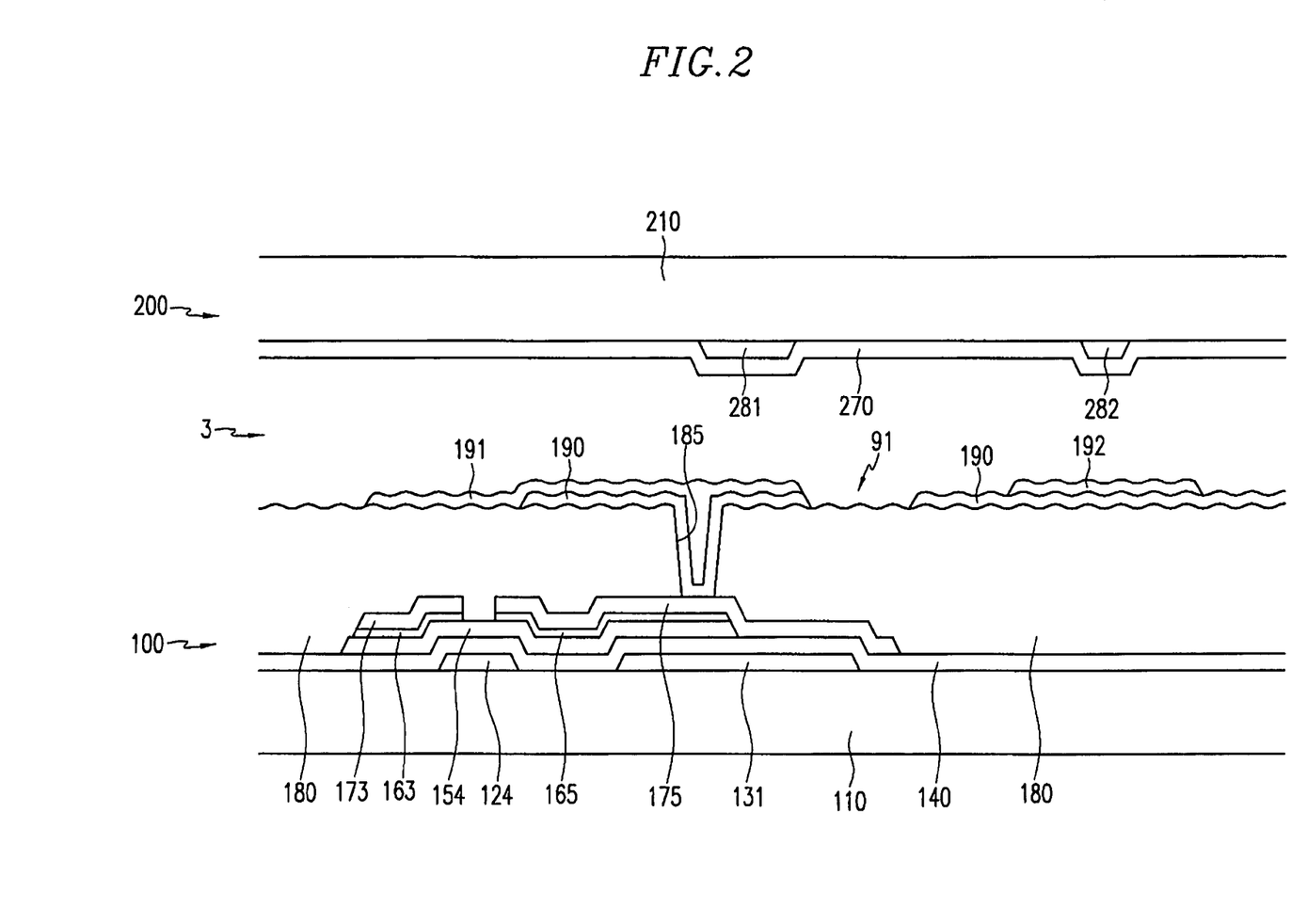
FIG. 2 is a cross-sectional view cut along line II-II' of FIG. 1.
Figure 3:
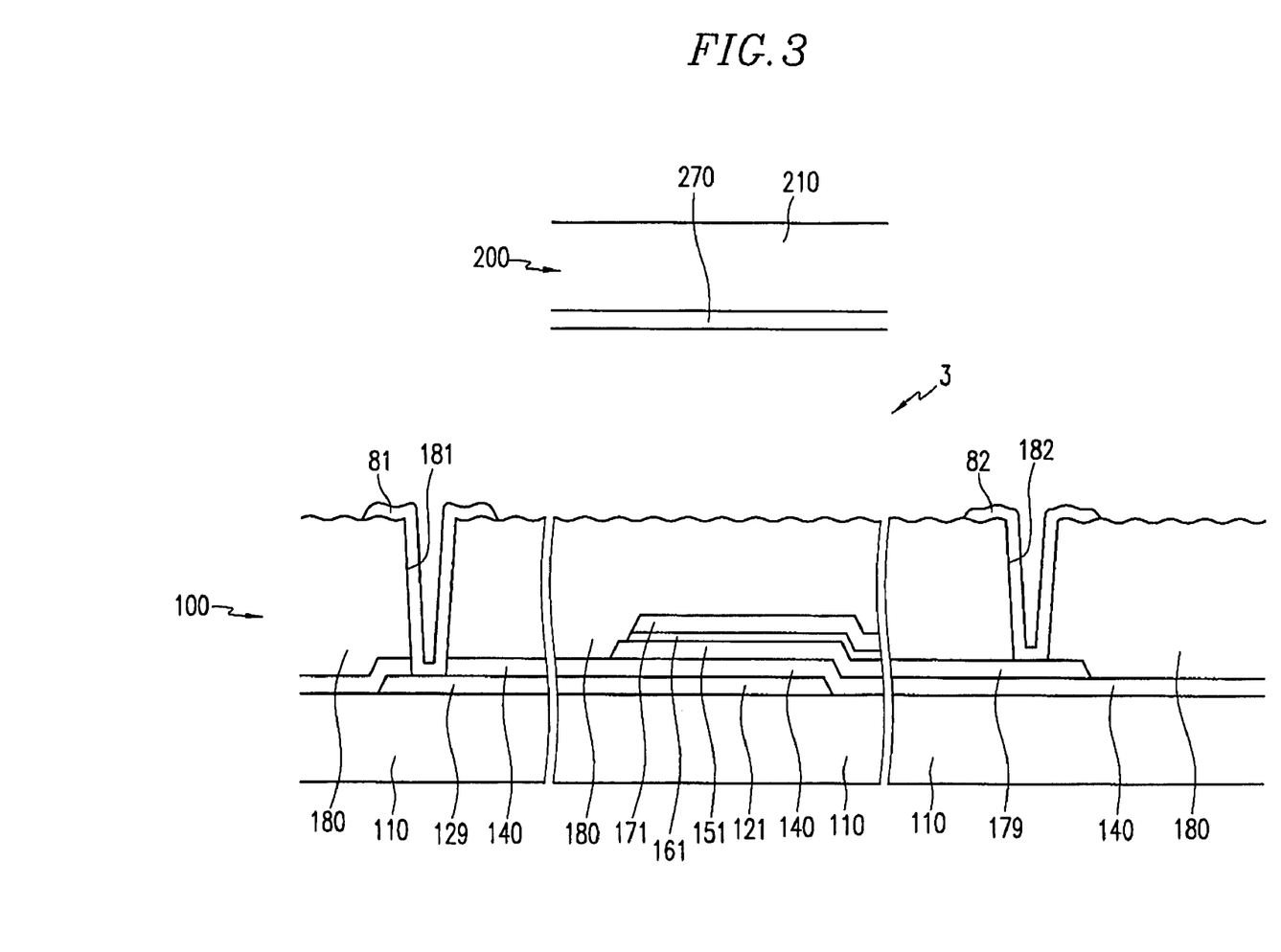
FIG. 3 is a cross-sectional view cut along line III-III' of FIG. 1.

FIG. 1 is a layout view of an LCD device according to an exemplary embodiment of the present invention, FIG. 2 is a cross-sectional view cut along line II-II' of FIG. 1, and FIG. 3 is a cross-sectional view cut along line III-III' of FIG. 1.

The LCD device of this embodiment includes a thin film transistor (TFT) panel 100 and a common electrode panel 200 facing each other, and an LC layer 3 interposed therebetween. The TFT panel 100 is configured as described below.

Gate lines 121 and storage electrode lines 131 are disposed at an insulating substrate 110. Each gate line 121 extends substantially in a horizontal direction, and includes gate electrodes 124 protruding downward and an end portion 129 having a relatively large size to be connected to another layer or an external device. If a gate driving circuit (not shown) for generating gate signals is integrated on the insulating substrate 110, however, the gate lines 121 may be directly connected to the gate driving circuit, without the end portion 129.

Each storage electrode line 131 extends substantially in the horizontal direction and includes a plurality of branches. Each branch is comprised of a vertical line 132 extending upward in a vertical direction that is substantially perpendicular to the horizontal direction, which is a direction of extension of both the storage electrode lines 131 and the gate lines 121, and an expansion area 135 connected to an end of the vertical line 132. The storage electrode lines 131 receive a common voltage from a common electrode 270 of the common electrode panel 200.

The gate lines 121 and the storage electrode lines 131 may be made of aluminum (Al) containing metals such as Al and Al alloys, silver (Ag) containing metals such as Ag and Ag alloys, copper (Cu) containing metals such as Cu and Cu alloys, molybdenum (Mo) containing metals such as Mo and Mo alloys, chrome (Cr), tantalum (Ta), titanium (Ti), or the like. The gate lines 121 may have a multi-layered structure in which two conductive layers (not shown) having different physical properties are included. In such a case, a first conductive layer of the two conductive layers may be made of a low resistivity metal, for example, an Al-containing metal, an Ag-containing metal, or a Cu-containing metal in order to reduce delay of signals or voltage drop in the gate lines 121 and the storage electrode lines 131, and a second conductive layer of the two conductive layers may be made of a material having good contact properties with other materials, for example, indium tin oxide (ITO) and indium zinc oxide (IZO). For example, Mo series materials, Cr, Ta, or Ti, etc., may be used for formation of the two conductive layers. Desirable examples of combinations of the two conductive layers include a lower Cr layer and an upper Al layer, and a lower Al layer and an upper Mo layer.

In an exemplary embodiment, all lateral sides of the gate lines 121 and the storage electrode lines 131 slope at an angle of about 30° to about 80° relative to a surface of the insulating substrate 110. A gate insulating layer 140 made of nitride silicon (SiNx), etc., is disposed on the gate lines 121.

Linear semiconductors 151 made of hydrogenated amorphous silicon abbreviated as "a-Si" or polysilicon are disposed on the gate insulating layer 140. Each linear semiconductor 151 extends substantially in a vertical direction. Each linear semiconductor 151 includes projections 154, each extending along respective gate electrodes 124. Also, each linear semiconductor 151 broadens in an immediate vicinity of a place to be crossed with the gate lines 121 in order to cover a wide dimension of the gate lines 121.

Linear ohmic contacts 161 and island-shaped ohmic contacts 165 are disposed on the linear semiconductors 151 and the projections 154 of the linear semiconductors 151, respectively. The linear ohmic contacts 161 and the island-shaped ohmic contacts 165 are made of silicide or N+ hydrogenated amorphous silicon that is highly doped with N-type impurities. Each of the linear ohmic contacts 161 includes protrusions 163. A set of the protrusions 163 and the island-shaped ohmic contact 165 are placed on each of the projections 154 of the linear semiconductors 151.

All lateral sides of the linear semiconductors 151 and the linear ohmic contacts 161 and island-shaped ohmic contacts 165 slope by about 30° to about 80° with respect to the surface of the insulating substrate 110.

Data lines 171 and drain electrodes 175 are disposed on the linear and island-shaped ohmic contacts 161 and 165 and the gate insulating layer 140.

The data lines 171 extend substantially in the vertical direction. The data lines 171 are crossed with the gate lines 121 and transmit data voltages. Each data line 171 includes source electrodes 173 extending along respective gate lines 121, and an end portion 179 having a relatively large size to be electrically connected to another layer or an external device.

The drain electrodes 175 are separated from the source electrodes 173 and the data lines 171. Each drain electrode 175 has a large dimension to be overlapped with the expansion area 135 of the storage electrode line 131. Each drain electrode 175 also includes a vertical line 176 extending along the vertical line 132 of the storage electrode line 131 to be overlapped therewith, and a horizontal line 177 connected to an end of the vertical line 176 and extending in the horizontal direction that is substantially parallel to the direction of extension of both the storage electrode lines 131 and the gate lines 121 to be overlapped with the storage electrode line 131.

Each one of the gate electrodes 124, the source electrodes 173, the drain electrodes 175, and the projections 154 of the linear semiconductor 151 form a TFT. A TFT channel is formed at the projection 154 provided between the source electrode 173 and the drain electrode 175.

The data lines 171 and the drain electrodes 175 are preferably made of refractory metals, such as Mo, Cr, Ta, Ti, or alloys thereof. The data lines 171 and the drain electrodes 175 may be configured to have the multi-layered structure including at least two conductive layers, each having low resistivity or good contact properties. Desirable examples of the multi-layered structure include a lower Mo layer, an intermediate Al layer, and an upper Mo layer, but the above-mentioned combinations of a lower Cr layer and an upper Al layer, and a lower Al layer and an upper Mo layer are also possible.

Similar to the gate lines 121, all lateral sides of the data lines 171 and the drain electrodes 175 also slope by about 30° to about 80° with respect to the surface of the insulating substrate 110.

The linear and island-shaped ohmic contacts 161 and 165 are interposed between the linear semiconductor 151 and the data line 171 and between the drain electrode 175 and the projection 154 of the linear semiconductor 151, in order to reduce contact resistance therebetween. The linear semiconductor 151 is partially exposed at a place where the data line 171 and the drain electrode 175 do not cover the linear semiconductor 151, as well as between the source electrode 173 and the drain electrode 175. Most of the linear semiconductor 151 is formed more narrowly than the data line 171, but a portion of the linear semiconductor 151 has a relatively large dimension at a place to be crossed with the gate lines 121 in order to prevent the data lines 171 from being shorted.

A passivation layer 180 is disposed on the data lines 171, the drain electrodes 175, and exposed portions of the linear semiconductors 151. The passivation layer 180 is preferably made of a photosensitive organic material having good planarization properties, an insulating material having a relatively low dielectric constant of below 4.0 such as a-Si:C:O, a-Si:O:F, etc., produced by plasma enhanced chemical vapor deposition (PECVD), or an inorganic material such as $SiN_2$. The passivation layer 180 may be designed to have a double-layered structure including a lower inorganic insulating layer and an upper organic insulating layer. A top surface of the passivation layer 180 is uneven.

The passivation layer 180 is provided with contact holes 182 and 185, through which the end portions 179 of the data lines 171 and the drain electrodes 175 are exposed, respectively. Contact holes 181 penetrate the passivation layer 180 and the gate insulating layer 140, to expose the end portions 129 of the gate lines 121.

Transparent electrodes 190, made of transparent conductive materials such as ITO, IZO, etc. and contact assistants 81 and 82 are disposed on portions of the passivation layer 180 corresponding to the contact holes 181 and 182, respectively. Reflective electrodes 191 and 192 are disposed on the transparent electrodes 190 and the passivation layer 180. A transparent electrode 190 and a pair of the reflective electrodes 191 and 192 form a pixel electrode.

The pixel electrode, including the transparent electrode 190 and the pair of the reflective electrodes 191 and 192, has an uneven profile along the uneven surface of the passivation layer 180, and is physically and electrically connected to the drain electrode 175 through the contact hole 185 to receive data voltages from the drain electrode 175.

When a data voltage is applied to the pixel electrode, the pixel electrode generates an electric field in cooperation with the common electrode 270 of the common electrode panel 200, determining orientations of liquid crystal molecules interposed between the pixel electrode and the common electrode 270.

Also, a set of pixel electrodes and the common electrode 270 form a capacitor capable of storing an applied voltage even when the TFT is turned off. The capacitor will be referred as a "liquid crystal capacitor" below. To enhance a voltage storage ability, another capacitor called a "storage capacitor" is further provided, which is electrically connected to the liquid crystal capacitor in parallel. The storage capacitor is implemented by overlapping the pixel electrode with the storage electrode line 131. Accordingly, to increase a capacitance of the storage capacitor, i.e., a storage capacitance, it is preferable to ensure a largest possible overlap dimension and to form a distance between the pixel electrode and the storage electrode line 131 more closely, in a manner to further elongate and partially expand the storage electrode line 131 along with the drain electrode 175 connected to the pixel electrode. The storage capacitor may be implemented by overlapping the pixel electrode with one of the gate lines 121 adjacent thereto, called a "previous gate line."

Each of the transparent electrodes 190 is positioned on the storage electrode line 131 and the horizontal line 177 of the drain electrode 175, with an aperture 91 formed in the horizontal direction. The transparent electrode 190 is divided into a lower part and an upper part by the aperture 91 and both vertical sides of the transparent electrode 190 are constricted inwardly at a barrier of the lower and upper parts divided by the aperture 91, to form a trapezoid-shaped dimension. Lower corners of the transparent electrode 190 are chamfered, and a portion of the transparent electrode 190 near upper corners are also slantingly constricted, similarly to the lower corners. The vertical line 132 of the storage electrode line 131 and the vertical line 176 of the drain electrode 175 are positioned on a vertical centerline of the transparent electrode 190.

The pair of reflective electrodes 191 and 192 are made of an opaque reflective metallic material such as Al or Ag, etc., and include an upper reflective electrode 191 placed above the aperture 91 and a lower reflective electrode 192 placed below the aperture 91.

The upper reflective electrode 191 includes a vertical line, extending along the vertical lines 132 and 176, and an expansion area, wholly covering an area ranging from a bottom side of the expansion area 135 of the storage electrode line 131 to a top side of the gate line 121 positioned above the expansion area 135, within two adjacent data lines 171. The vertical line of the upper reflective electrode 191 is formed more widely than the vertical line 132 of the storage electrode line 131 and the vertical line 176 of the drain electrode 175, in order to cover all of them. The vertical lines 132 and 176 and the vertical line Of the upper reflective electrode 191 divide the upper part of the transparent electrode 190 into a right transmissive region and a left transmissive region.

The lower reflective electrode 192 traverses and bisects the lower part of the transparent electrode 190 in the horizontal direction. An end of the vertical line of the upper reflective electrode 191 and both ends of the lower reflective electrode 192 are shaped as funnels.

The contact assistants 81 and 82 are individually connected to the end portion 129 of the gate line 121 and the end portion 179 of the data line 171 through the contact holes 181 and 182, respectively. The contact assistants 81 and 82 supplement adhesion between the end portions 129 and 179 and exterior devices, and protect the end portions 129 and 179. When a gate driving circuit is integrated on the TFT panel 100, the contact assistant 81 may serve as a connection means between the end portion 129 of the gate line 121 and the gate driving circuit. Alternatively, the contact assistant 81 may be omitted.

The common electrode panel 200 is configured as described below.

A shading means (not shown) called a "black matrix" is provided on an insulating substrate 210 made of transparent glass, etc., to prevent light leakage. The shading means is opposite to the transparent electrodes 190 and includes apertures having similar shapes to the transparent electrodes 190. Alternatively, the shading means may be comprised of a pattern corresponding to the gate lines 121 or the data lines 171, and another pattern corresponding to the TFTs. The shading means may have a single-layered structure of Cr, or a double-layered structure including Cr and chrome oxide.

Alternatively, the shading means may have an organic layer structure with black pigments.

Color filters (not shown) are disposed on the insulating substrate 210 and most of them are placed within a region surrounded by the shading means. Each of the color filters may extend in the vertical direction along the transparent electrode 190, exhibiting any one of red, green, and blue colors. The shading means and the color filters may be disposed on the TFT panel 100.

An overcoat layer (not shown) may be disposed on the shading means and the color filters to prevent them from being exposed and to present a flat surface.

Projection groups made of an organic material, are disposed on the insulating substrate 210. One projection group is comprised of an upper projection 281 that is disposed opposite to the vertical line of the upper reflective electrode 191 and extends along the upper reflective electrode 191 in the vertical direction, and a lower projection 282 that is disposed opposite to the lower reflective electrode 192 and extends along the lower reflective electrode 192 in the horizontal direction. The upper and lower projections 281 and 282 are formed more narrowly than the corresponding upper and lower reflective electrodes 191 and 192, to be completely covered by them. End portions of the upper and lower projections 281 and 282 are shaped as funnels. In other words, sides of the and lower projections 281 and 282 extend parallel to each other except at an end portion of the upper and lower projections 281 and 281 where sides of the and lower projections 281 and 282 diverge from each other to form a funnel shape.

The common electrode 270 made of a transparent conductive material such as ITO, IZO, etc., is disposed on the projections 281 and 282, and the insulating substrate 210. The common electrode 270 includes expanded portions along the upper and lower projections 281 and 282. Alternatively, the upper and lower projections 281 and 282 may be disposed on the common electrode 270.

Polarizers (not shown) are provided on outer surfaces of the TFT and common electrode panels 100 and 200, and vertical aligning layers (not shown) are provided on inner surfaces of the TFT and common electrode panels 100 and 200.

Figure 4:
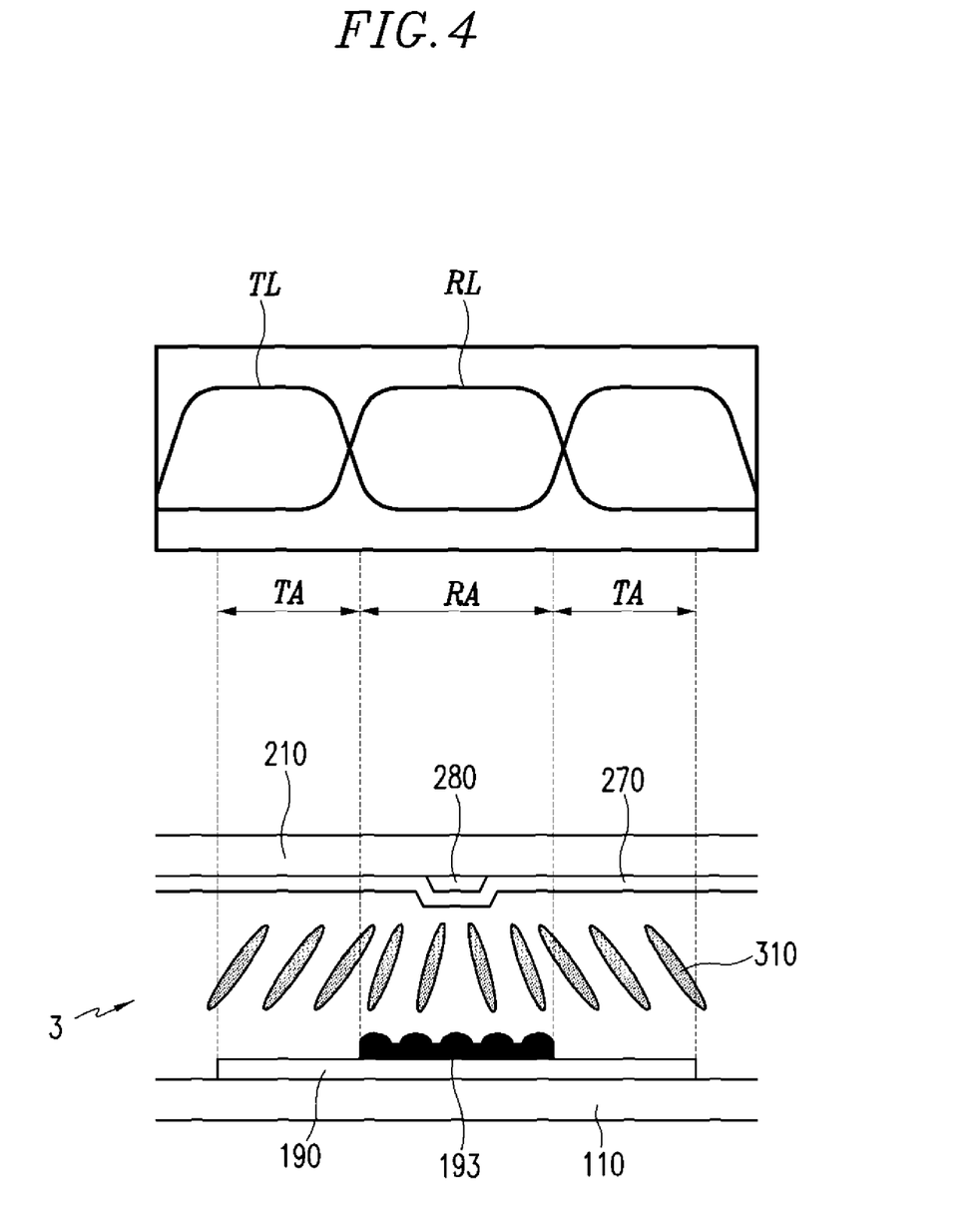
FIG. 4 is a schematic cross-sectional view showing a profile of transmission luminance and reflection luminance of the LCD device shown in FIG. 1 through FIG. 3.

As shown in FIG. 4, the liquid crystal layer 3 has negative dielectric anisotropy, and long axes of liquid crystal molecules 310 in the liquid crystal layer 3 are aligned substantially perpendicular to surfaces of the insulating substrates 110 and 210 of the TFT and common electrode panels 100 and 200, respectively, when no electric field is generated.

When the common voltage is applied to the common electrode 270 while a data voltage is applied to the pixel electrode, an electric field is generated, which is substantially perpendicular to surfaces of the TFT and common electrode panels 100 and 200. In response to the electric field, the liquid crystal molecules 310 begin to change their orientation to be perpendicular to the direction of the electric field.

At this time, the upper and lower projections 281 and 282 offer some horizontal components to the electric field generated in the liquid crystal layer 3, or some pre-tilts to the liquid crystal molecules 310. Furthermore, constricted edge portions and the aperture 91 of the transparent electrode 190 offer some horizontal components to the electric field, so that the liquid crystal molecules 310 are aligned to be perpendicular to sides of the transparent electrode 190. As shown in FIG. 1, two long vertical sides of an upper part of the transparent electrode 190, and the upper projection 281 are formed parallel to each other, while a bottom side of a lower part of the transparent electrode 190, the aperture 91, and the lower projection 282 are formed parallel to each other, so that four domains delimited by the upper and lower projections 281 and 282 are formed, each having different orientations. In such a case, the chamfered corners of the transparent electrode 190 and inward-constricted portions near the aperture 91, and the oblique sides of the upper and lower projections 281 and 282 relieve radical variations of tilt directions generated in each domain.

Meanwhile, a cell gap of a portion with the upper and lower projections 281 and 282 has a relatively small delay value, compared with cell gaps of other portions without any projection. Therefore, such a portion may be used as a reflective area, without any additional control of the cell gap. This will be described in more detail with reference to FIG. 4 below.

FIG. 4 is a schematic cross-sectional view for showing a profile of transmission luminance and reflection luminance of the LCD device shown in FIG. 1 through FIG. 3.

In FIG. 4, reference number 193 is a reflective electrode, 280 is a projection formed under the common electrode 270, abbreviation RA is a reflective electrode area where the reflective electrode 193 exists, TA is the remaining area excepting RA, RL is a reflection luminance, and TL is a transmission luminance.

As shown in FIG. 4, the reflection luminance RL of the reflective electrode area RA with the projection 280 is very high. In other words, the projection 280 of FIG. 4 is differentiated from prior art projections that are incapable of contributing to a display due to high reflection luminance RL.

In this way, transflective LCD devices according to exemplary embodiments of the present invention utilize the upper and lower projections 281 and 282 as reflective areas, thereby realizing the multi-domain structure while still maintaining higher reflection efficiency.

Hereinafter, an LCD device according to another exemplary embodiment of the present invention will be described in detail with reference to FIG. 5 through FIG. 7.

Figure 5:
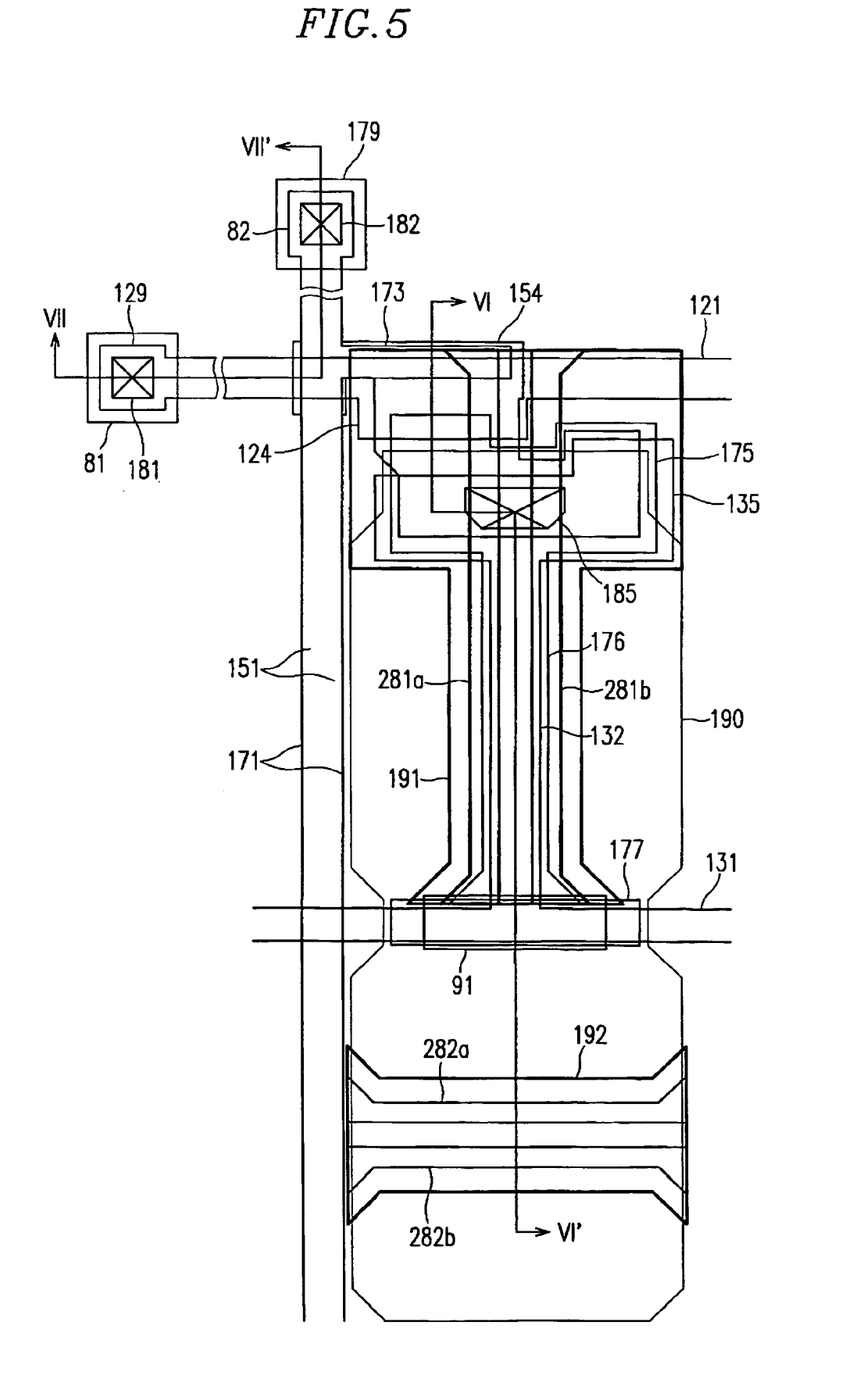
FIG. 5 is a layout view of an LCD device according to another exemplary embodiment of the present invention.
Figure 6:
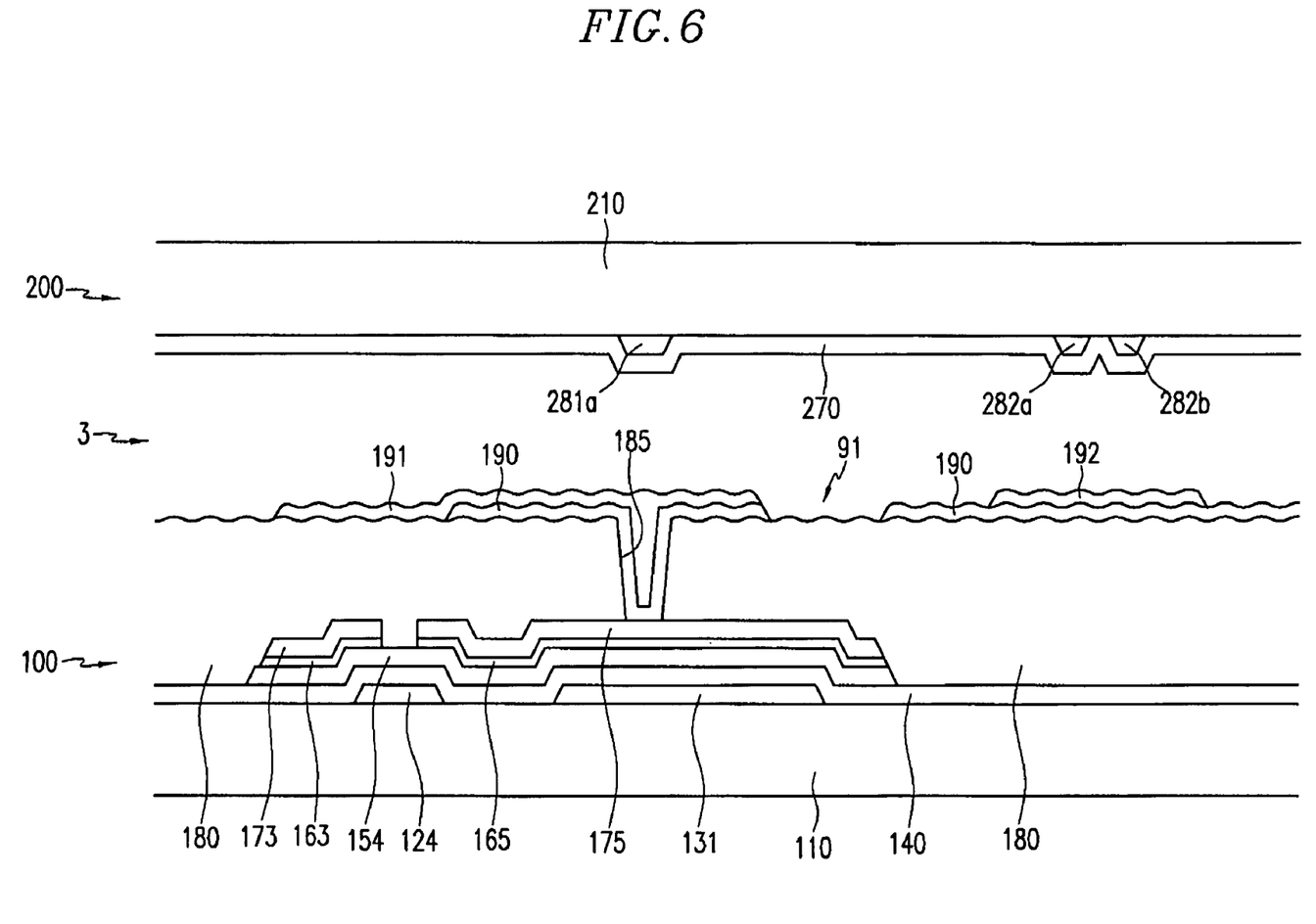
FIG. 6 is a cross-sectional view cut along line VI-VI' of FIG. 5.
Figure 7:
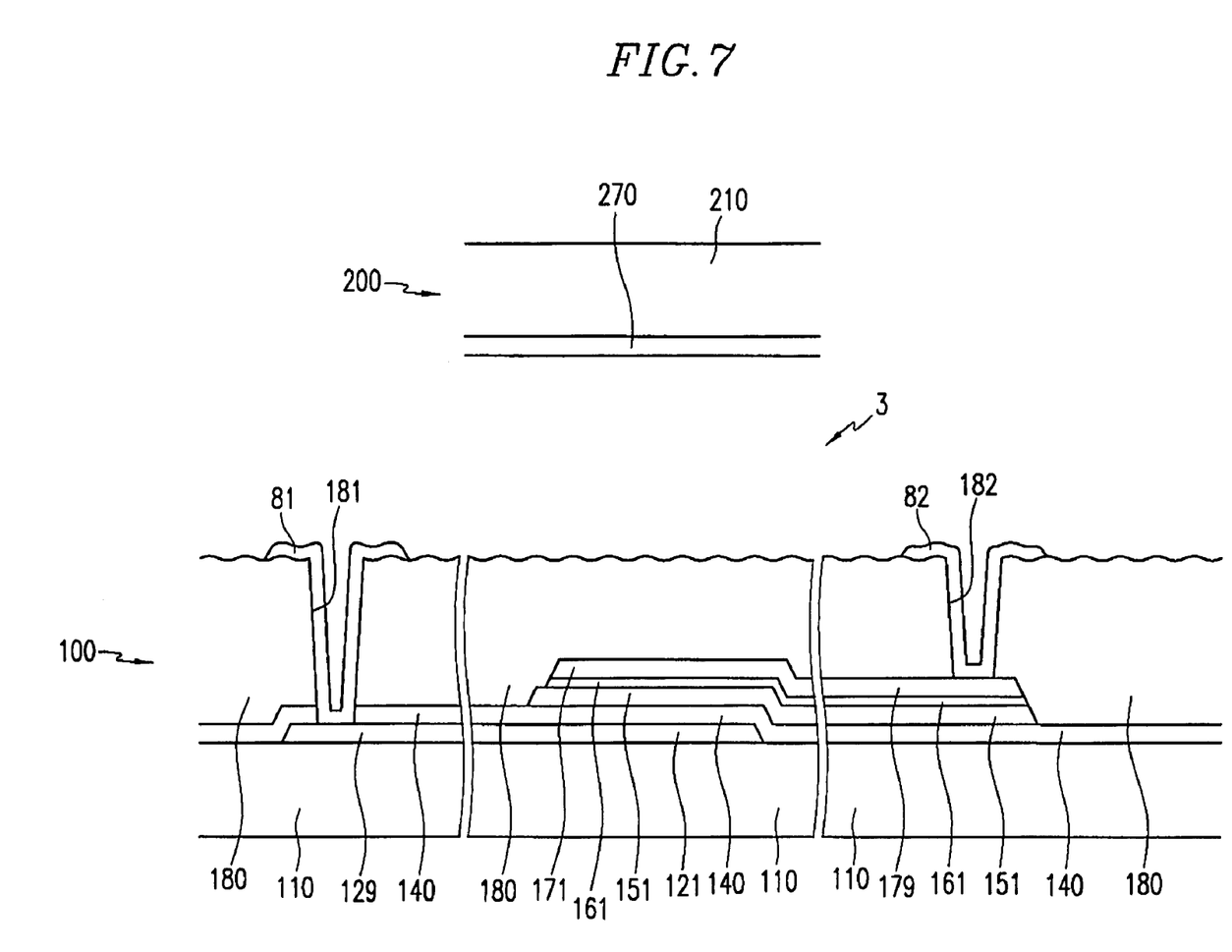
FIG. 7 is a cross-sectional view cut along line VII-VII' of FIG. 5.

FIG. 5 is a layout view of an LCD device according to another exemplary embodiment of the present invention, FIG. 6 is a cross-sectional view cut along line VI-VI' of FIG. 5, and FIG. 7 is a cross-sectional view cut along line VII-VII' of FIG. 5.

Referring to FIG. 5 to FIG. 7, an LCD device of this exemplary embodiment includes the TFT panel 100 and the common electrode panel 200 facing each other, and the LC layer 3 interposed therebetween. Stratiform configurations of the TFT and common electrode panels 100 and 200 of this embodiment are nearly equal to those shown in FIG. 1 to FIG. 3.

The TFT panel 100 of this exemplary embodiment is configured substantially similar to the exemplary embodiment shown in FIGS. 1 to 3 except for certain differences described below.

The gate lines 121, each including the gate electrodes 124 and the end portion 129, and the storage electrode lines 131, each including the vertical line 132 and the expansion area 135, are disposed on the insulating substrate 110.

Then, the gate insulating layer 140, the linear semiconductors 151 each including the projections 154, the linear ohmic contacts 161 each including the protrusions 163, and the island-shaped ohmic contact 165 are successively disposed on the insulating substrate 110 having the gate lines 121 and the storage electrode lines 131 thereon.

The data lines 171, each including the source electrodes 173 and the end portion 179, and the drain electrodes 175, each including the vertical line 176 and the horizontal line 177, are disposed on the linear and island-shaped ohmic contacts 161 and 165, and then the passivation layer 180 is disposed thereon. The contact holes 181, 182, and 185 are formed to penetrate the passivation layer 180 and the gate insulating layer 140. The pixel electrodes, each including the transparent electrode 190 with the aperture 91 and the pair of the reflective electrodes 191 and 192, and the contact assistants 81 and 82 are disposed on the passivation layer 180.

The common electrode panel 200 of this exemplary embodiment is configured as described below.

Projection groups 281a, 281b, 282a, and 282b, and the common electrode 270 are disposed on the insulating substrate 210.

Unlike FIG. 1 to FIG. 3, each of the projection groups 281a, 281b, 282a, and 282b of this exemplary embodiment includes a pair of upper projections 281a and 281b, and a pair of lower projections 281a and 281b. The upper projections 281a and 281b are symmetrical and centered on a vertical centerline of an upper part of the transparent electrode 190. The lower projections 282a and 282b are symmetrical and centered on a horizontal centerline of a lower part of the transparent electrode 190. Vertical sides of the upper projections 281a and 281b have end portions extending toward vertical sides of the transparent electrode 190 to form a short slant side. Similarly, horizontal sides of the lower projections 282a and 282b have end portions extending toward and away from the aperture 91, each forming a short slant side.

A distance between the upper projections 281a and 281b is substantially equal to or smaller than a width of the upper projections 281a and 281b. For example, the distance between the upper projections 281a and 281b may be formed to be three quarters of the width of the upper projections 281a and 281b. Similarly, a distance between the lower projections 282a and 282b is substantially equal to or smaller than width of the lower projections 282a and 282b. For example, the distance between the lower projections 282a and 282b may be formed to be three quarters of the width of the lower projections 282a and 282b.

By forming the upper protrusions 281a and 281b and the lower protrusions 282a and 282b as described above, vertical components are reduced in the electric field generated in the liquid crystal layer 3 and a phase delay of light passing through the liquid crystal layer 3 is also reduced. As a result, a height of respective projections and the cell gaps on the pair of reflective electrodes 191 and 192 are reduced.

The linear semiconductor 151 has substantially a same planar shape as the data line 171, the drain electrode 175, and underlying linear and island-shaped ohmic contacts 161 and 165. However, the linear semiconductor 151 is partially exposed between the source electrode 173 and the drain electrode 175.

All projections shown in FIG. 1 through FIG. 7 may be replaced with apertures or depressed portions. In such a case, shapes of the apertures or depressed portions and arrangements thereof may be transformed variously.

Figure 8:
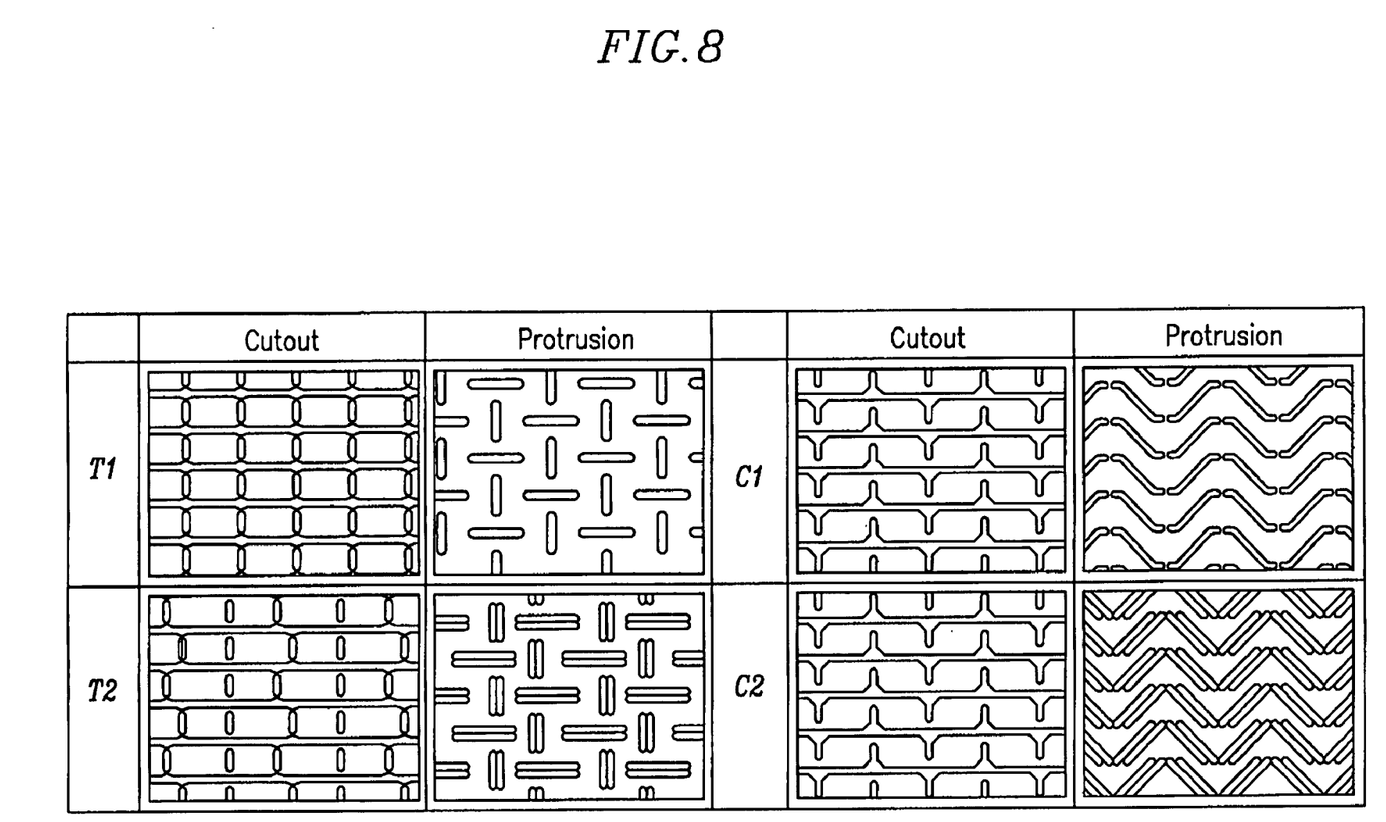
FIG. 8 shows various aperture patterns formed in pixel electrodes and various projection patterns formed in common electrodes of LCD devices according to exemplary embodiments of the present invention.

FIG. 8 shows various aperture patterns formed in the pixel electrodes and various projection patterns formed in the common electrodes of LCD devices according to exemplary embodiments of the present invention.

In FIG. 8, T1 shows an aperture or cutout pattern and a protrusion pattern based on a basic structure illustrated in FIG. 1 through FIG. 3, and T2 shows an aperture or cutout pattern and a protrusion pattern based on a basic structure illustrated in FIG. 4 through FIG. 5. C1 and C2 show modified patterns, i.e., gull or chevron-shaped cutout and protrusion patterns. In particular, in T1 and T2, the protrusion patterns are shaped as lattices. In other words, vertically formed projections (based on a lower projection of FIG. 1 through FIG. 5) and horizontally formed projections (based on an upper projection of FIG. 1 through FIG. 5) are alternately arranged.

Table 1 shows results of comparing a number of domains, an aperture ratio of transmission, and a reflective area ratio, among a typical transflective LCD device without protrusions or cutout portions, a typical transmissive LCD device with a chevron-shaped aperture pattern, and LCD devices adopting the patterns of FIG. 8.

TABLE 1

|  | typical transflective | typical aperture | T1 | T2 | C1 | C2 |
| --- | --- | --- | --- | --- | --- | --- |
| Number of domains | 1 | 4 | 4 | 4 | 4 | 4 |
| transmission aperture ratio | 32.0 | 43.5 | 52.5 | 46.0 | 49.0 | 44.5 |
| reflective area ratio (%) | 53.0 | 0 | 32.5 | 39.0 | 36.0 | 40.5 |

As shown in Table 1, LCD devices of FIG. 8 represent higher transmission aperture ratios than those of the typical transflective LCD devices and typical aperture adopting LCD devices. The LCD devices of FIG. 8 represent relatively lower reflective area ratios than that of the typical transflective LCD devices, but nevertheless reflective area ratios of the LCD devices of FIG. 8 are fairly good values. Further, since all of the LCD devices of FIG. 8 have four domains, they can obtain a wider viewing angle.

As shown above, LCD devices of the present invention include the multi-domain structure and show prominent reflective efficiency.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A display device including a reflective area and a transmissive area, the display device comprising:
a first panel and a second panel facing each other;
a liquid crystal layer interposed between the first and second panels, and including a plurality of liquid crystal molecules; and
a domain partitioning member partitioning the liquid crystal layer into a plurality of domains, and disposed on the second panel and in the reflective area;
wherein the first panel includes a transparent electrode that is disposed in the transmissive area and includes an aperture;
wherein the liquid crystal molecules of the liquid crystal layer are vertically aligned with respect to the first and second panels when no electrical field is applied between the first and second panels,
wherein the domain partitioning member is disposed in the reflective area and not in the transmissive area;
wherein the domain partitioning member comprises a first projection and a second projection extending substantially perpendicular to each other; and
wherein the aperture of the transparent electrode is disposed between the first projection and the second projection, and extends substantially parallel to the second projection.

2. The display device of claim 1, wherein the domain partitioning member comprises a pair of first projections adjacent to each other, and a pair of second projections adjacent to each other.

3. The display device of claim 2, wherein an interval between the pair of first projections and an interval between the pair of second projections is equal to or smaller than a width of each one of the pair of projections, respectively.

4. The display device of claim 1, wherein the transparent electrode is disposed opposite to the first and second projections.

5. The display device of claim 1, wherein the first panel further comprises a first reflective electrode and a second reflective electrode that are disposed on the transparent electrode, and
wherein the first reflective electrode faces the first projection while the second reflective electrode faces the second projection.

6. The display device of claim 5, wherein the first panel further comprises a storage electrode that overlaps the transparent electrode via an insulator.

7. The display device of claim 6, wherein the storage electrode overlaps the aperture.

8. The display device of claim 7, wherein the storage electrode faces the first projection.

9. The display device of claim 8, wherein the first panel further comprises a thin film transistor connected to the transparent electrode and comprising a gate electrode, a source electrode, and a drain electrode, and the drain electrode extends along the storage electrode.

10. The display device of claim 1, wherein the transparent electrode faces the domain partitioning member.

11. The display device of claim 10, wherein the transparent electrode and the domain partitioning member are arranged to form a chevron shape.

12. The display device of claim 1, wherein the domain partitioning member comprises a rectilinear portion having opposite edges that extend parallel to each other and an end portion diverging from the rectilinear portion to form a funnel shape.

13. The display device of claim 1, wherein the second panel comprises a common electrode disposed on the domain partitioning member.

14. The display device of claim 13, wherein an elongation direction of the domain partitioning member is substantially parallel to a boundary between the reflective area and the transmissive area.

15. The display device of claim 1, wherein an elongation direction of the domain partitioning members is substantially parallel to the boundary between the reflective area and the transmissive area.

16. The liquid crystal display device of claim 1, wherein outer boundaries of the domain partitioning members form a closed loop in the reflective area.

17. A liquid crystal display device including a reflective area and a transmissive area, the liquid crystal display device comprising:

a first panel comprising a reflective electrode and a transparent electrode, the transparent electrode comprising a first portion that does not overlap the reflective electrode and includes an aperture;
a second panel facing the first panel and comprising:
a plurality of domain partitioning members, the domain partitioning members comprising:
a pair of first domain partitioning members partitioning a liquid crystal layer into a plurality of domains adjacent to each other and extending substantially parallel to a boundary between the reflective electrode and the first portion of the transparent electrode; and
a second domain partitioning member, and
a common electrode facing the reflective electrode and the transparent electrode; and
the liquid crystal layer interposed between the first and second panels, and including a plurality of liquid crystal molecules,
wherein the liquid crystal molecules of the liquid crystal layer are vertically aligned with respect to the first and second panels when no electrical field is applied between the first and second panels,
wherein the domain partitioning members are disposed in the reflective area and not in the transmissive area,
wherein the pair of first domain partitioning members extend substantially perpendicular to the second domain partitioning member, and
wherein the aperture of the transparent electrode is disposed between the pair of first domain partitioning members and the second domain partitioning member, and extends substantially parallel to the pair of first domain partitioning members.

18. The liquid crystal display device of claim 17, wherein each of the domain partitioning members faces the reflective electrode.

19. The liquid crystal display device of claim 18, wherein the reflective electrode symmetrically divides an entire portion of the transparent electrode.

20. The liquid crystal display device of claim 18, wherein the reflective electrode symmetrically divides a partial portion of the transparent electrode.

21. The liquid crystal display device of claim 17, wherein the first domain partitioning members are spaced apart from the boundary between the reflective electrode and the first portion of the transparent electrode.

22. The liquid crystal display device of claim 21, wherein the reflective electrode overlaps an entire area of the domain partitioning members.

23. The liquid crystal display device of claim 21, wherein outer boundaries of the domain partitioning members form a closed loop fully overlapping the reflective electrode.

24. The display device of claim 17, wherein outer boundaries of the domain partitioning member form a closed loop in the reflective area.

* * * * *